Patented Nov. 21, 1933

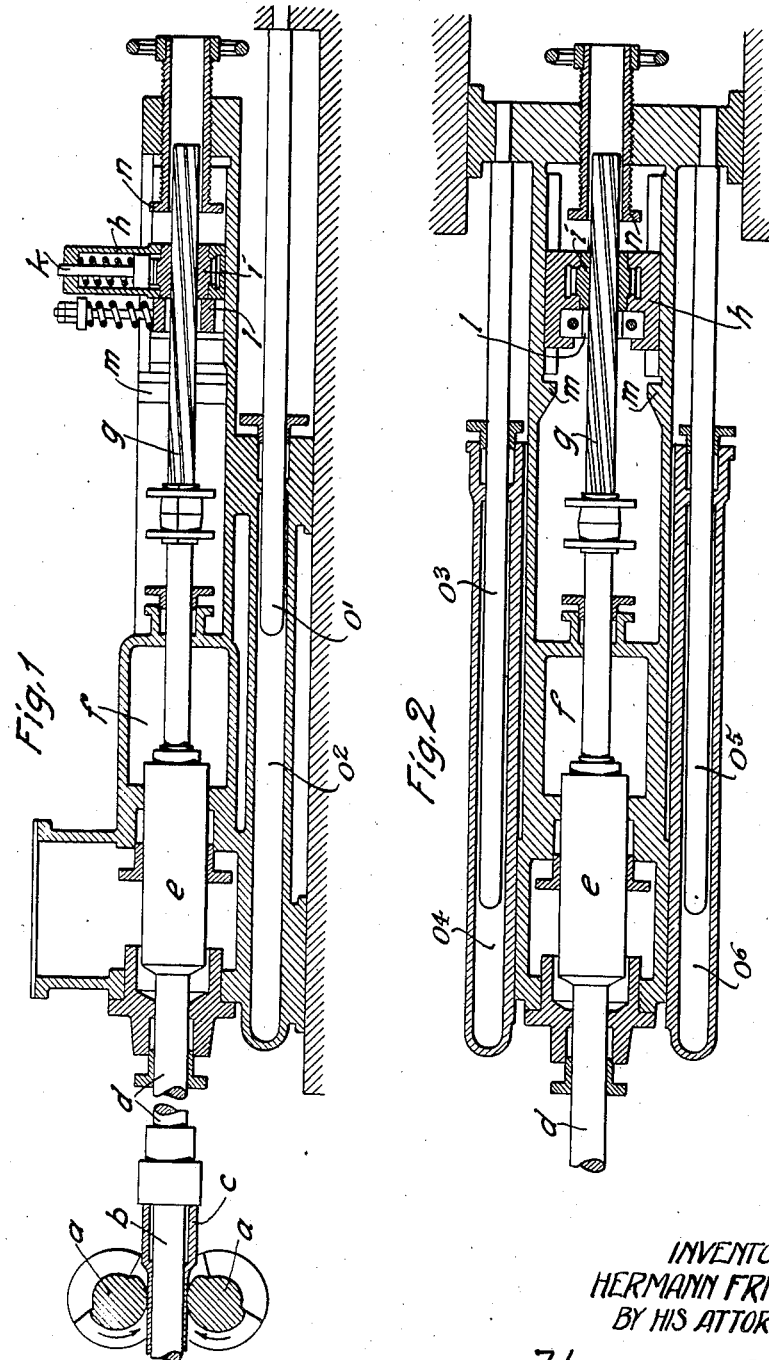

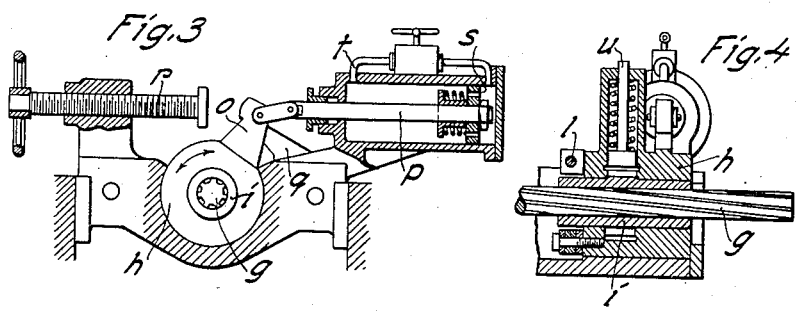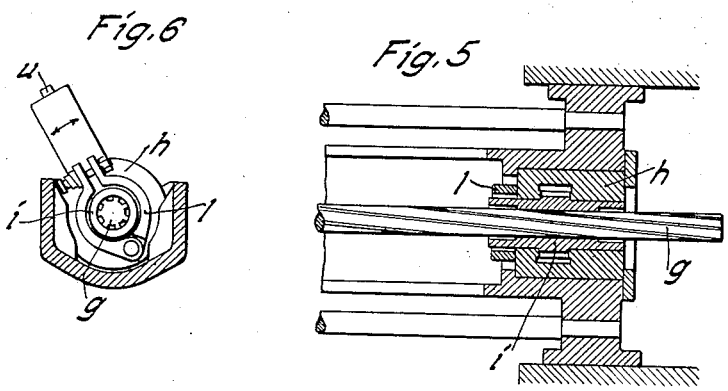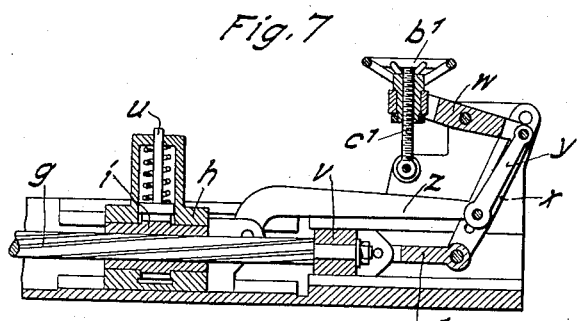

1,936,475

UNITED STATES PATENT OFFICE 1,936,475

FEEDING DEVICE FOR PILGER ROLLING MILLS

Hermann Fritsch, Dusseldorf-Rath, Germany

Application August 5, 1930, Serial No. 473,248, and in Germany August 22, 1929

11 Claims. (Cl. 80—14)

This invention is for improvements in or relating to feeding device for Pilger rolling mills and more particularly to apparatus of such feeding devices which is arranged to rotate the Pilger mandrel and bloom thereon through a predetermined angle between consecutive operations of the Pilger rolls. The described rotational movements of the mandrel on the return stroke are effected through the medium of a helically grooved spindle rigidly connected thereto and a nut arranged in engagement therewith, the said nut being rotated under the control of a ratchet mechanism by the spindle as it is moved axially by the rolling operation in one direction and the nut causing the spindle to rotate as the same moves axially upon the return stroke in the opposite direction.

With known arrangements of this character, in order to rotate the mandrel after each working stroke thereof through an angle as near as possible to 90°, it is necessary that spindles for use with different diameters of tubes to be rolled are constructed with helical grooves of different pitch in accordance with the lengths of the various strokes of the feed movements required. The large number of the spindles necessary to maintain in stock in the case of a rolling mill which is required to deal with tubes of an extended range of diameters, and the time required for changing the spindles, increases the cost of the tubes rolled and hinders production.

This invention obviates these defects by providing an apparatus in which only one helically grooved spindle is required for operating a Pilger rolling mill with any length of feed stroke of the mandrel which may be required.

According to this invention there is provided a feeding device for a Pilger rolling mill of the type set forth wherein the spindle during the return stroke thereof is arranged to move the nut and means are arranged to restrict the said movement of the nut relatively to the spindle by a predetermined amount for the purpose of effecting a definite rotational movement of the spindle.

The described movement of the nut may be axial or rotational with respect to the helically grooved spindle. The said spindle is of a length which permits the longest stroke to be obtained which may be required and the helical grooves therein are of a pitch which ensures that the Pilger mandrel may be rotated through an angle of at least 90° with the smallest stroke required.

In order that the invention may be fully understood reference is directed to the accompanying drawings in which:—

Figure 1 is a vertical longitudinal section of a portion of a Pilger rolling mill provided with a feeding device constructed in accordance with this invention.

Figure 2 is a sectional plan of Figure 1.

Figure 3 is a transverse section of a portion of a modified form of feeding device constructed in accordance with this invention.

Figure 4 is a longitudinal section of the apparatus shown in Figure 3.

Figure 5 is a sectional plan of Figure 4.

Figure 6 is a transverse section of the apparatus shown in Figures 3 to 5 illustrating details hereinafter described, and Figure 7 is a vertical longitudinal section similar to a portion of Figure 1, illustrating another modified form of feeding device.

Referring first to the construction shown in Figures 1 and 2 of the drawings, Pilger rolls $a$ are arranged to operate upon a bloom $c$ supported upon a Pilger mandrel $b$. The mandrel $b$ is carried by the piston rod $d$ of a piston $e$ which is arranged to operate in a compressed air cylinder $f$ in a known manner. A helically grooved spindle $g$ is rigidly coupled to the free end of the piston rod $d$ and is arranged to extend through a correspondingly internally grooved nut which is in the form of a ratchet wheel $i$ provided in a housing $h$. A spring controlled detent pawl $k$ is arranged to co-act with the ratchet wheel $i$ and is mounted in the housing $h$. The said housing is slidably mounted in guides formed in the frame of the mill. Movement of the housing $h$ in the guides is limited in the direction of the return stroke of the mandrel by fixed abutments $m$ and in the direction of the rolling operation by an adjustable abutment $n$. A pair of semi-circular jaws $l$ are provided in the housing $h$ which are arranged to grip the spindle $g$ frictionally under the influence of springs.

Fixed piston $O^1$ working in cylinder $O^2$, which is movable with the feeding apparatus, causes displacement of feeding apparatus when fluid pressure is applied within the cylinder.

At the end of the Pilgering process the mandrel is withdrawn by reason of fluid pressure acting on pistons $O^3$ $O^5$ movable with the mandrel and working within fixed cylinders $O^4$ $O^6$.

The operation of the apparatus is as follows:—

As the rolls $a$ rotate in the direction of the arrows, Figure 1, in engagement with the bloom $c$ upon the mandrel $b$ the piston rod $d$ and spindle $g$ are moved to the right in Figures 1 and 2. The jaws $l$ which engage frictionally with the spindle $g$ ensures that the housing $h$ is moved with the spindle $g$ until it contacts with the adjustable abutment $n$, whereupon the nut and ratchet wheel $i$ are rotated by the spindle.

When the rolls $a$ release the bloom $c$, the compressed air in the cylinder $f$ returns the piston $e$, piston rod $d$, mandrel $b$, bloom $c$ and the spindle $g$ to the left in Figures 1 and 2 whilst the jaws $l$ ensure that the housing $h$ is moved with the spindle during the first part of the return stroke until it contacts with the fixed abutments $m$. When the housing $h$ is brought to rest by the abutments $m$ the nut and ratchet wheel $i$ are rotated by the spindle $g$ until the pawl $k$ is pressed into engagement with an adjacent tooth of the ratchet wheel $i$ whereupon the nut is then maintained stationary and the subsequent movement of the spindle $g$ and the bloom $c$ causes the same to be rotated during the remaining portion of the return stroke. By an adjustment of the abutment $n$, either by hand or by mechanical means, the stroke of the housing $h$ may be adjusted so that the movement of the nut $i$ by the spindle $g$ ensures that the mandrel $b$ and bloom $c$ thereon are rotated only through the desired angle, for example 90°.

From the foregoing it will be observed that the movement of the nut and ratchet wheel $i$ are restricted or limited by the abutments to the desired extent so that the rotation of the bloom through the desired angle may be accomplished for different sizes of tubes.

The modified form of construction shown in Figures 3 to 6 illustrates an apparatus in which the housing $h$ for the nut and ratchet $i$ is mounted in the mill frame so as to be rotatable about the axis of the helically grooved spindle $g$. The said housing is provided with an arm $o$ which is connected by a link to a piston rod $p$ of an oil dash-pot. The angular movement of the arm $o$ of the housing $h$ is limited in one direction by a fixed abutment $q$ and in the other direction by an adjustable abutment $r$. The piston of the dash-pot is provided with an annular valve $s$ which permits the oil to flow unhindered through the piston upon movement of the arm $o$ towards the fixed abutment $q$, but which prevents the flow of oil through the piston when moved in the opposite direction. During the latter movement the oil is arranged to flow through a by-pass pipe $t$ which is restricted as desired by means of an adjustable valve arranged in the said pipe. Two jaws $l$ are arranged in frictional engagement with the nut $i$, similarly to those described in connection with the spindle $g$ in the construction illustrated in Figures 1 and 2 and ensure that the housing $h$ and arm $o$ are rotated by the ratchet wheel between the abutments $q$ and $r$. A spring controlled detent pawl $u$ is arranged to co-act with the teeth of the ratchet wheel $i$.

The operation of this apparatus is as follows:—

As the spindle $g$ is moved by the rolling operation of the Pilger rolls in the manner described with reference to Figures 1 and 2, the spindle rotates the nut and ratchet wheel $i$ which in turn through the medium of the jaws $l$ rotate the housing $h$ until the arm $o$ contacts with the abutment $q$.

This rotation of the housing $h$ is permitted by the dash-pot due to the unhindered passage of the oil through the valve $s$. Thereafter the nut and ratchet wheel $i$ only are rotated by the spindle $g$ for the remaining portion of the stroke thereof. Upon the return stroke of the spindle $g$, when the mandrel is free to rotate, the dash-pot overcomes the frictional action of the jaws $l$ and the nut and ratchet wheel $i$ are rotated until the detent pawl $u$ is pressed into engagement with an adjacent tooth of the ratchet wheel and prevents the nut from rotating further. The spindle $g$ then commences to rotate the Pilger mandrel and bloom whilst the dash-pot yields under the increased pressure produced by the said rotation so that the housing $h$ gradually rotates until the arm $o$ bears against the abutment $r$. The remaining portion of the stroke of the spindle $g$ completes the rotational movement of the Pilger mandrel. The rotational movement of the housing $h$ may be adjusted by the abutment $r$ so as to reduce the rotational movement of the Pilger mandrel to any desired angle, for example an angle of 90°. It is to be observed that with this arrangement the oil dash-pot ensures that a certain and smooth action is effected and that the rotary movement of the Pilger mandrel commences slowly and without shock.

Further the oil dash-pot may be used similarly and with the same good effect, with the first form of construction described.

Referring now to Figure 7 of the drawings, an apparatus is shown in which the helically grooved spindle $g$ is rotatably connected at its free end with a cross-head $v$ arranged to slide in guides in the mill frame. The cross-head $v$ is connected by a link $a_1$ to one end of an arm $x$ which is pivotally connected at its other end to the mill frame. A nut in the form of a ratchet wheel $i$ is arranged in engagement with the spindle $g$ similarly to the arrangement described with reference to Figures 1 and 2, the said nut being mounted in a housing $h$ which is slidably mounted in guides in the mill frame and in which a spring controlled detent pawl $u$ is arranged so as to co-act with the teeth of the ratchet wheel. The housing $h$ is connected by a link $z$ to a pin which is arranged to extend into a longitudinal slot provided in the arm $x$. One end of an arm $y$ is also connected to the said pin whilst the other end thereof is pivotally connected to one end of a double armed lever $w$ which is oscillatably mounted to the mill frame. The other end of the double armed lever $w$ is provided with a nut in the form of a hand wheel $b_1$ which is arranged in engagement with a screw $c_1$ secured at one end to the mill frame. It will be observed that longitudinal movements of the spindle $g$ produce oscillating movements of the arm $x$ which in turn, through the medium of the link $z$ causes the ratchet housing $h$ to be reciprocated in its guides.

As will be appreciated from Figure 7 the fact that the point of connection of the link $z$ to the arm $x$ lies between the pivoted connection of the said arm to the mill frame and the point of attachment of the link $a_1$ to the arm $x$ causes reciprocating movements of the housing $h$ to be shorter than those of the spindle $g$. By an operation of the hand wheel $b_1$ the double armed lever $w$ and arm $y$ may be moved so as to displace the point of attachment of the link $z$ to the arm $x$ along the slot provided in the said arm and as the said point of attachment approaches the pivot of the arm $x$ it will be observed that the reciprocating movements of the housing $h$ become correspondingly shorter. In this apparatus the rotation of the spindle $g$ and the Pilger mandrel is effected by virtue of the difference in the lengths of the strokes of the spindle $g$ and the nut $i$ with the housing $h$ and the said rotation therefore corresponds to the angle determined by the helical grooves in the spindle $g$ for a length thereof equal to the difference in the said strokes. It is thus possible to adjust the difference between the stroke of the spindle g and the stroke of the housing h so that the Pilger mandrel may be rotated through any required angle, for example 90° upon each return stroke of the said mandrel and it will be observed that the rotation of the mandrel is distributed over the whole of the said return stroke with the consequential advantage that relatively heavy blooms of large diameter are rotated at smaller angular speeds than relatively lighter blooms of smaller diameter.

I claim:

1. A Pilger rolling mill which comprises a plurality of Pilger rolls arranged to move a mandrel from a normal position axially in one direction during a rolling operation, means for returning said mandrel to the normal position, a helically grooved spindle operatively connected to said mandrel so as to move in unison therewith a nut having internal ridges arranged in engagement with the grooves of said spindle, means arranged to ensure that the said nut is moved by the spindle during each axial movement thereof by the mandrel, means for restricting the movements of the nut by a predetermined amount relatively to the spindle, and means causing the nut to rotate the spindle and the mandrel through a predetermined angle only during the return stroke thereof to the normal position.

2. A Pilger rolling mill which comprises a plurality of Pilger rolls arranged to move a mandrel from a normal position axially in one direction during a rolling operation, means for returning said mandrel to the normal position, a helically grooved spindle operatively connected to said mandrel so as to move in unison therewith, a nut having internal ridges arranged in engagement with the grooves of said spindle, means arranged to ensure that the said nut is moved axially by the spindle during each axial movement thereof by the mandrel, means for restricting the movements of the nut by a predetermined amount relatively to the spindle, and means causing the nut to rotate the spindle and the mandrel through a predetermined angle only during the return stroke thereof to the normal position.

3. A Pilger rolling mill which comprises a plurality of Pilger rolls arranged to move a mandrel from a normal position axially in one direction during a rolling operation, means for returning said mandrel to the normal position a helically grooved spindle operatively connected to said mandrel so as to move in unison therewith, a nut having internal ridges arranged in engagement with the grooves of said spindle, a ratchet mechanism arranged to control the rotation of the nut, means arranged to ensure that the said nut is moved by the spindle during each axial movement thereof by the mandrel, means for restricting the movements of the nut by a predetermined amount relatively to the spindle, and means causing the nut to rotate the spindle and the mandrel through a predetermined angle only during the return stroke thereof to the normal position.

4. A Pilger rolling mill which comprises a plurality of Pilger rolls arranged to move a mandrel from a normal position axially in one direction during a rolling operations means for returning said mandrel to the normal position, a helically grooved spindle operatively connected to said mandrel so as to move in unison therewith, a nut having internal ridges arranged in engagement with the grooves of said spindle, a ratchet mechanism arranged to control the rotation of the nut, means arranged to ensure that the said nut is moved axially by the spindle during each axial movement thereof by the mandrel, means for restricting the movements of the nut by a predetermined amount relatively to the spindle, and means causing the nut to rotate the spindle and the mandrel through a predetermined angle only during the return stroke thereof, to the normal position.

5. A Pilger rolling mill which comprises a plurality of Pilger rolls arranged to move a mandrel from a normal position axially in one direction during a rolling operation, means for returning said mandrel to the normal position, a helically grooved spindle operatively connected to said mandrel so as to move in unison therewith, a nut having internal ridges arranged in engagement with the grooves of said spindle, a housing for the said nut, means arranged to connect said housing frictionally with said spindle so as to ensure that the said nut is moved by the spindle during each axial movement thereof by the mandrel, means for restricting the movements of the nut by a predetermined amount relatively to the spindle, and means causing the nut to rotate the spindle and the mandrel through a predetermined angle only during the return stroke thereof to the normal position.

6. A Pilger rolling mill which comprises a plurality of Pilger rolls arranged to move a mandrel from a normal position axially in one direction during a rolling operation, means for returning said mandrel to the normal position, a helically grooved spindle operatively connected to said mandrel so as to move in unison therewith, a nut having internal ridges arranged in engagement with the grooves of said spindle, a ratchet mechanism arranged to control the rotation of the nut, a housing for the said nut, means arranged to connect said housing frictionally with said spindle so as to ensure that the said nut is moved by the spindle during each axial movement thereof by the mandrel, means for restricting the movements of the nut by a predetermined amount relatively to the spindle, and means causing the nut to rotate the spindle and the mandrel through a predetermined angle only during the return stroke thereof to the normal position.

7. A Pilger rolling mill which comprises a plurality of Pilger rolls arranged to move a mandrel from a normal position axially in one direction during the rolling operation, means for returning said mandrel to the normal position, a helically grooved spindle operatively connected to said mandrel so as to move in unison therewith, a nut having internal ridges arranged in engagement with the grooves of said spindle, a ratchet mechanism arranged within a housing for said nut so as to control the rotation of the nut, means arranged to connect said housing frictionally with said spindle so as to ensure that the said nut is moved axially by the spindle during each axial movement thereof by the mandrel, means for restricting the movements of the nut by a predetermined amount relatively to the spindle, and means causing the nut to rotate the spindle and the mandrel through a predetermined angle only during the return stroke thereof to the normal position.

8. A Pilger rolling mill which comprises a plurality of Pilger rolls arranged to move a mandrel from a normal position axially in one direction during a rolling operation, means for returning said mandrel to the normal position, a helically grooved spindle operatively connected to said mandrel so as to move in unison therewith; a nut having internal ridges arranged in engagement with the grooves of said spindle, a ratchet mechanism arranged to control the rotation of the nut, means arranged to ensure that the said nut is moved by the spindle during each axial movement thereof by the mandrel, a pair of abutments at least one of which is adjustable relatively to the other arranged to limit the movements of the nut by a predetermined amount relative to the spindle, and means causing the nut to rotate the spindle and the mandrel through a predetermined angle only during the return stroke thereof to the normal position.

9. A Pilger rolling mill which comprises a plurality of Pilger rolls arranged to move a mandrel from a normal position axially in one direction during a rolling operation, means for returning said mandrel to the normal position, a helically grooved spindle operatively connected to said mandrel so as to move in unison therewith, a nut having internal ridges arranged in engagement with the grooves of said spindle, a ratchet mechanism arranged to control the rotation of the nut, means arranged to ensure that the said nut is moved axially by the spindle during each axial movement thereof by the mandrel, a pair of abutments, at least one of which is adjustable relatively to the other, arranged to limit the movements of the nut by a predetermined amount relative to the spindle, and means causing the nut to rotate the spindle and the mandrel through a predetermined angle only during the return stroke thereof to the normal position.

10. A Pilger rolling mill which comprises a plurality of Pilger rolls arranged to move a mandrel from a normal position axially in one direction during a rolling operation, means for returning said mandrel to the normal position, a helically grooved spindle operatively connected to said mandrel so as to move in unison therewith, a nut having internal ridges arranged in engagement with the grooves of said spindle, a ratchet mechanism arranged to control the rotation of the nut, a housing for the said nut, means arranged to connect said housing frictionally with said spindle so as to ensure that the said nut is moved by the spindle during each axial movement thereof by the mandrel, a pair of abutments, at least one of which is adjustable relatively to the other, arranged to limit the movements of the nut by a predetermined amount relatively to the spindle, and means causing the nut to rotate the spindle and the mandrel through a predetermined angle only during the return stroke thereof to the normal position.

11. A Pilger rolling mill which comprises a plurality of Pilger rolls arranged to move a mandrel from a normal position axially in one direction during the rolling operation, means for returning said mandrel to the normal position, a helically grooved spindle operatively connected to said mandrel so as to move in unison therewith, a nut having internal ridges arranged in engagement with the grooves of said spindle, a ratchet mechanism arranged to control the rotation of the nut, a housing for the said nut, means arranged to connect said housing frictionally with said spindle so as to ensure that the said nut is moved axially by the spindle during each axial movement thereof by the mandrel, a pair of abutments at least one of which is adjustable relatively to the other, arranged to limit the movements of the nut by a predetermined amount relative to the spindle, and means causing the nut to rotate the spindle and the mandrel through a predetermined angle only during the return stroke thereof to the normal position.

HERMANN FRITSCH.